United States Patent [19]
Wiech, Jr.

[11] Patent Number: 5,262,122
[45] Date of Patent: Nov. 16, 1993

[54] MANUFACTURE OF PARTS FROM PARTICULATE MATERIAL

[75] Inventor: Raymond E. Wiech, Jr., San Diego, Calif.

[73] Assignee: Witec Cayman Patents, Ltd., Cayman Islands

[21] Appl. No.: 804,529

[22] Filed: Dec. 10, 1991

Related U.S. Application Data

[60] Division of Ser. No. 692,955, Apr. 26, 1991, abandoned, which is a continuation of Ser. No. 143,315, Jan. 11, 1988, abandoned, which is a continuation of Ser. No. 520,764, Aug. 8, 1983, abandoned, which is a continuation of Ser. No. 191,996, Sep. 29, 1980, abandoned, which is a continuation-in-part of Ser. No. 111,632, Jan. 14, 1980, abandoned.

[51] Int. Cl.$^5$ .............................. B22F 1/02; B22F 3/12
[52] U.S. Cl. .......................................... 419/36; 419/37; 419/38; 419/44; 264/63; 264/86
[58] Field of Search .................. 419/36, 37, 38, 44; 264/63, 86

[56] References Cited

U.S. PATENT DOCUMENTS

| | | | |
|---|---|---|---|
| 2,744,011 | 5/1956 | Samuel et al. | 419/17 |
| 2,894,837 | 7/1959 | Onstott et al. | 419/36 X |
| 3,113,927 | 12/1963 | Cochardt | 264/86 |
| 3,313,622 | 4/1967 | Potet | 419/37 X |
| 3,673,293 | 6/1972 | Teague | 264/86 |
| 3,728,110 | 4/1973 | Klar et al. | 75/211 |
| 3,758,653 | 9/1973 | Patel et al. | 264/86 |
| 3,871,630 | 3/1975 | Wanetzky et al. | 419/44 X |
| 3,917,778 | 11/1975 | Shiraki et al. | 264/63 |
| 4,011,291 | 3/1977 | Curry | 264/86 X |
| 4,197,118 | 4/1980 | Wiech, Jr. | 75/228 |
| 4,252,759 | 2/1981 | Yannas et al. | 264/86 |
| 4,404,166 | 9/1983 | Wiech, Jr. | 419/36 |

*Primary Examiner*—Donald P. Walsh
*Assistant Examiner*—Daniel Jenkins
*Attorney, Agent, or Firm*—Jay M. Cantor

[57] ABSTRACT

The disclosure relates to a method of binder removal from a green body before sintering or the like wherein the green body is initially heated to a temperature above the melting or flow point of the binder to liquify the binder and, at the elevated temperature, a small portion of the green body is brought into intimate contact with a non-supporting porous body of lower capillarity potential for the liquid binder. The liquid is drawn from all parts of the green body to the region of contact between the porous body and the green body and enters the body of lower capillarity potential preferentially, removing liquid from the green body through the surface of the green body only at said region of contact. The draining is continued with or without further increase in temperature until the green body is opened or becomes permeable.

20 Claims, 1 Drawing Sheet

MANUFACTURE OF PARTS FROM PARTICULATE MATERIAL

CROSS REFERENCE TO PRIOR APPLICATIONS

"This application is a division of Ser. No. 692,955, filed Apr. 26, 1991, now abandoned, which is a continuation of Ser. No. 143,315, filed Jan. 11, 1988, now abandoned, which is a continuation of Ser. No. 520,764, filed Aug. 8, 1983, now abandoned which is a continuation of Ser. No. 191,996, filed Sep. 29, 1980, now abandoned, which is a continuation-in-part of Ser. No. 111,632, now abandoned, filed Jan. 14, 1980.

BACKGROUND OF THE INVENTION

The art of forming shaped articles from particulate mixtures is well known in the art. Classically, a desired particulate material is mixed with a binder and then formed into the desired shape, this being called the green body. The green body is then fired to provide a fusion of the particulate material and to drive off the binder, thereby producing the desired shaped product with desired surface texture, strength, etc.

In the production of shaped objects in the manner above described, it has been found that it is necessary to remove the binder before the green body can be sintered. This is a very difficult task and the prior art has recognized this problem and has therefore attempted to remove binder from the shaped green body prior to the step of firing. Examples of said prior art are set forth in the patent of Strivens U.S. Pat. No. 2,939,199, Wiech U.S. Pat. No. 4,197,118, British Patent Nos. 779,242, 1,516,079 and Curry U.S. Pat. No. 4,011,291. Unusual conditions such as vacuum or solvent atmospheres or packing of parts are required by the prior art and cracking of parts due to process irregularities remains a problem. In addition, prior art solvent extraction techniques present a health hazzard which is difficult and expensive to eliminate.

The above noted prior art teaches various methods of removing the continuous phase in such a way so as to minimize the disruption of the green body during the binder removal. In general, the mechanisms involved in the removal of the continuous phase are such that there is interplay between the cohesive forces of the green body, i.e. the tensile strength of the green body, and the forces involved in the removal of the binder. The objective is to maintain, wherever possible, the green body in a net compressive loaded situation and in all cases to never allow the stress forces to exceed the tensile forces of the body, i.e. the forces created by the removal of the binder must always be overcome by the net residual tensile strength of the body, otherwise the body will rupture in some fashion. In addition, as the fluid binder moves across the interface from the interior portions of the body to the exterior environment, viscous drag forces occur which tend to cause exfoliation (a sloughing off) of at least some of the outermost layer of the particulate material on the body, thereby causing loss of material and diminution of the surface integrity of the body which, as is well known, affects several physical properties of material. In a very real sense the physical characteristics of the final sintered body tends to replicate the physical characteristics of the green body. Any macroscopic surface imperfections that are mechanically introduced, such as by physical contact with an external body, would be transferred to the green body and then subsequently, upon sintering, be transferred to the final body. The mechanism of transfer, as would take place, for example, using the wick of Curry U.S. Pat. No. 4,011,291 to the green body would be of two types: the first by the low intrinsic strength of the green body flowing into a scratch due to an imperfection in the wick and the second type would be the viscosity induced flowing of fine particles from the green body into the imperfection area and the subsequent filling of the area by the particulate material of the green body which has been loosened by the flow of material from the body.

BRIEF DESCRIPTION OF THE INVENTION

If wicking is introduced over a small selected area of the green body, all areas of the body that are not in physical contact with the wick will experience a net compressive force due to material leaving the body and the volume loading of the body being increased. Naturally, the part of the body which is in contact with the wicking area will experience the same phenomenom that would occur at a Curry type wick. However, by not requiring or constraining the body to an external wick and removing the material over a small selected area of a chosen surface over which surface imperfections are acceptable, the difficulties encountered with the physical contact of a large wick are substantially overcome. The only portion of the body in which there is surface degradation and surface loss of particulate matter is that region of the body which is attached to the umbilical area. The remaining portions of the surface that are not in physical contact with the umbilical area see only net compressive stresses and are compacted into a dense highly integral state maintaining the highest possible surface finish. The binder is removed by the wick wherein the forces on the binder in general are away from the surfaces of the green body except at the point where the wick contacts the green body. The binder is therefore removed by net forces which are directed toward a selected small area of the surface of the green body rather than substantially equally along the entire surface of the green body and in an outward direction. In addition, the hazzard and expense of prior art binder removal is substantially overcome in accordance with the present invention. Briefly, the green body is forced from a plastico-viscous material and is heated to a temperature at or above the flow point of the binder whereby the binder is rendered fluid but the body itself is solid. A small portion of the heated green body is placed in intimate contact with, but not packed in, a heated porous body that is wetted by the fluid binder and is chemically inert thereto. The fluid binder will flow from the green body into the relatively dry porous body, the amount and flow rate being determined by the relative free surface energy of liquid binder and porous body, the effective average pore size of the porous body, the viscosity of the fluid binder, the transfer efficiency of the fluid across the green body - porous body interface and other similar factors. If the temperature is then slowly raised, the volume thermal expansion of the fluid binder will generally aid in the removal of the binder and this is readily accomplished at the initial temperature advances during sintering. At some time, depending upon the specifics of the system, the body will be opened by virture of sufficient binder removal and sintering so further binder removal by other means can proceed. The remaining portion of the binder can later be burned off during sintering or reclaimed from the porous body prior to sintering by a process such as washing or leaching.

DETAILED DESCRIPTION OF INVENTION

Figure 1:
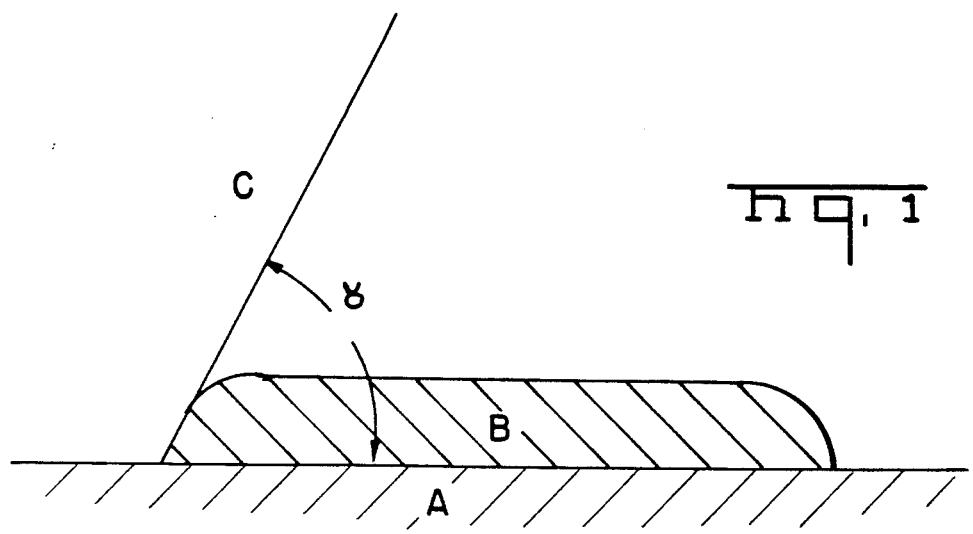
FIG. 1 is a showing of a classical sesile drop.

At the outset, it should be understood that, while the specific embodiments of the invention may refer to specific materials, the invention applies to all materials which can be finely divided to particulates which can be held together with a binder and then fused after binder removal by the application of heat thereto or an equivalent process step. In the manufacture of precision parts in accordance with the prior art and primarily those parts made of metal, cermets, and ceramics, articles could not usually be formed directly from particulate materials in accordance with classical injection molding techniques with commercial yields or with any degree of reliability, especially when the cross section presented molding difficulties due to thickness, large flat areas, etc. The reason for the manufacturing difficulty in parts produced from particulate materials is due to the large shrinkage in sintering and in the breakage during the binder removal stage of processing. In accordance with the present invention, particulate materials can be molded directly from particulate material to net shape without other costly manufacturing steps.

The processing steps in producing an article in accordance with the method of the present invention are (1) material selection, (2) mixing of materials, (3) forming of a green body, (4) binder removal and (5) sintering.

The starting material consists mainly of two (2) components, the particulate material and the binder. Each of these components can be, and usually is, a complex combination of materials designed and optimized to have the desired physical and chemical characteristics. The selection of the material is sensitive to the part end use and frequently requires skill to achieve the desired end result. For example, if the end product is to be porous, e.g. a filter element, a rather large particle size (in excess of 100 microns) would be selected. If a dense non-porous material is desired, then the initial particulate material would be very fine (less than 5 microns). Mixtures of particulate material sizes would be employed for other special properties.

In order to form the particulate material into a useful shape, it is desirable that the material have the property of plasticity or be plastico-viscous. This is accomplished by mixing suitable particulate material with a suitable binder. The binder has a flow point substantially below the sintering temperature of the particulate material which ultimately forms the final part. The minimum volume of binder required to render a particulate material plastic is that which just fills the interstices between the particle plus an infinitesimal volume i.e. $V+dV$ where V is the intersticial volume and dV is a differential increment. In general, as the volume fraction of the binder is increased from its minimum value of plasticity the particulate material/binder mixture often becomes more fluid at a given temperature.

The property of plasticity or plastico-viscosity is developed in the green molding material in two ways. First, if the particulate material is fine enough, i.e. has sufficient surface area per unit weight of particulate material, the particulate-binder mixture tends to become plastic. This is well known in the ceramic art in that fine materials are added to increase plasticity. Second, if the thermoplastic binder is formulated by a mixture of two or more thermoplastic materials with widely different melting or flow points, then, as the lower temperature flow component is removed, the high temperature flow component remains behind and provides strength to the remaining green body.

Any conventional binder can be used including, in some cases, water.

The ratio of particulate material volume to binder volume is important to the molding and processing properties of the mixture. In general, it is important that the ratio be maintained from batch-to-batch for the production of any given part.

The complete and thorough mixing of the binder and particulate material is important to producing consistant batch-to-batch properties of material. Mixing is normally accomplished at lower temperatures. The mixing step would accomplish the thorough coating of each particle and the breaking up of particulate agglomerates. Mixers and mills of sufficient energy to accomplish this are required. For example, a paddle or sigma blade mixer is generally sufficient to mix binder and particulate material of 10 micron size. For very fine material, about 0.5 microns, high energy mixing or pre ball milling with a portion of the binder may be necessary to achieve the desired dispersion. In general, as the particulate materials become finer, it requires greater effort to incorporate them into the binder due to the greater surface energy per unit volume of particulate material.

The mixed particulate material/binder system is then formed into the desired shape to provide a "green body" where dimensions are such that it will, when sintered, be of the designed final net dimensions. Any molding or machining technique, e.g. extrusion, casting, injection molding, drilling, tuning, etc. can be employed. The forming techniques used herein are those used in the prior art and do not form a part of the invention in and of themselves.

The binder removal operation involves removing a substantial portion of the binder from the green body. It is necessary to remove sufficient binder to open the interstitial passages of the green body so that, during the sintering processes, any gases or vapor liberated internally of the green body due to heating or chemical reactions may freely escape. If these gases and vapors could not freely escape, they would rapidly build up internal pressure in the green body and rupture it, causing cracking and deformation. If a portion of the green body is placed in intimate contact with a porous material, such as a porous ceramic plate, blotter or the like that has the property of being wet by the liquid binder and is initially free from binder and has sufficient volume and capillarity, then the binder will experience net fluid forces that will cause it to flow from all portions of the green body into the porous body at the points of contact with the green body if the temperature of the system is maintained above the melting point of the binder. The porous material provides no support to the green body and is designed to contact a minimum portion of the green body surface to avoid application of external forces to the green body.

The theory describing the phenomenon of capillarity is well known and will not be extensively covered here.

However, a brief description of the effect is in order. A set of forces exists between liquid and solid interfaces.

Figure 2:
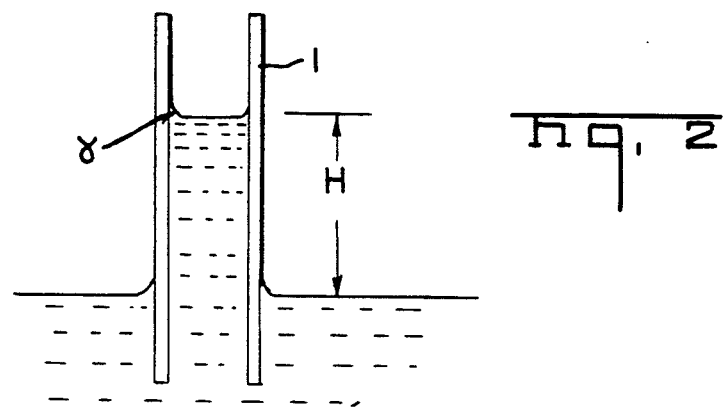
FIG. 2 is a showing of the rise of a liquid in a capillary.

FIG. 1 shows a classical sesile (or standing) liquid drop (B) on solid surface (A) surrounded by gas (or vapor or vacuum) (C). The drop makes a contact angle $\gamma$ with the solid surface depending upon the physical-chemical nature of A, B and C. As $\gamma$ approaches 0°, perfect wetting occurs and the drop will spread infinitely over A. The surface energy of the liquid in contact with gas results in the phenomenon of surface tension. FIG. 2 shows these effects on a small capillary tube 1.

The forces and geometry give rise to an unbalance of force which appear as a pressure or head which is described by:

$$H = \frac{K\sigma\cos(\gamma)}{D}.$$

Where
H is the capillary head.
$\sigma$ is the surface tension of the liquid against the gas.
$\gamma$ is the contact angle of the liquid with the surface.
D is the diameter of the capillary.
K is a constant.

It is obvious that if the capillary were long enough and placed in a zero gravity environment (e.g. horizontal), the pressure force (H) would drain the liquid reservoir. Notice that for any system with a positive K (which is virtually all systems encountered in a gas-liquid interface), the pumping motion occurs as long as $\gamma$ lies between 0° and 90°. Thus the actual capillary shape and quantity of interconnected capillaries does not alter the pumping ability, only the pumping rate.

The contact angle $\gamma$ between the liquid binder and porous material is minimized by maximizing the free surface energy of the material by cleaning it by an appropriate method. For example, it is well known that a clean glass surface will permit water to spread or "sheet" on the surface, i.e. have a low or almost zero contact angle. A dirty glass surface or a treated glass surface, such as one that has been waxed, causes the water to "bead" due to the resulting high contact angles. Thus, the porous material is a porous glass and the binder is water, which is an acceptable binder in some particulate systems. The water binder can be sufficiently removed to open the body by placing the green body in intimate contact with a clean porous glass surface.

Figure 3A:
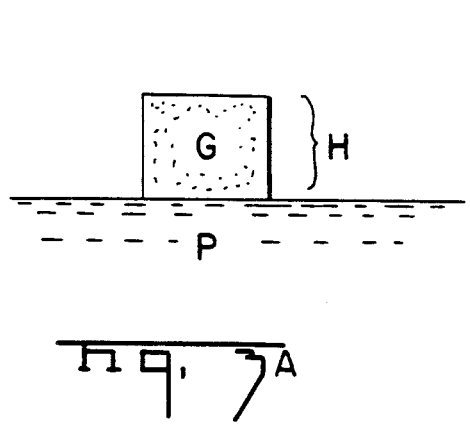
FIGS. 3A and 3B are diagrams showing the acceleration head effect.
Figure 3B:
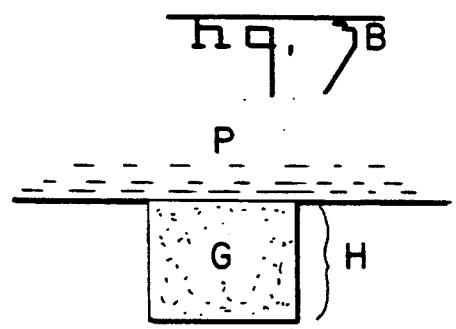

Of course, other criteria must also be met, since the requirement of the intimate contact between the green body and porous removal body is necessary, but not sufficient criteria. As was stated above, the capillary forces give rise to a pressure head which is the driving force behind the binder removal. It follows that, if the geometry of the green body and local gravity and/or acceleration effects are such as to produce pressure head requirements that cannot be met by the capillary force, the binder will simply not be removed. FIG. 3 illustrates this effect. FIG. 3A shows a green body with an effective position head due to gravity of H. In this case, H is in the same direction as the capillary forces and H will aid in the removal of the liquid binder from the green body G to the porous body P. In FIG. 3B the porous body P is in contact with the green body G, but is above G. Assuming an acceleration field, e.g. gravity, in the downward direction, the head H subtracts from the capillary head forces and, depending upon the size, geometry and other physical conditions, the capillary head may not be able to overcome the external head. Thus, the placement of the porous body is important and must be taken intouaccount.

During the binder removal, it is necessary to maintain the binder in a fluid state. As a matter of manufacturing prudence and to minimize binder removal time, it is desirable to slowly raise the green body temperature throughout the binder removal phase. The viscosity of normal liquids decreases and the volume increases as the temperature increases, with ocassional exceptions over small temperature range. Thus, if the temperature is increased slowly during the binder removal phase, the liquid flows through the capillary system easier due to reduced viscosity, thereby increasing the flow rate. The driving internal pressure is extended due to the increase in binder volume, i.e. a greater weight percentage of binder can be removed by continually adding volume to the binder by thermal expansion as binder volume is removed from the system due to the capillary removal of binder.

After a period, sufficient binder will have been removed so that the interstices of the green body will have been sufficiently opened to achieve a green body of sufficient permeability to proceed with the sintering phase. At this time the body will have sufficient permeability to permit internally generated gases and vapors to escape without creating sufficient internal pressure to rupture or otherwise disrupt or distort the body.

If the porous body employed for binder removal is porous ceramic or some other material that can be fired during the sintering process without deforming and which is otherwise inert in the system at sintering temperatures, the part can be sintered as an extension of the binder removal phase so that the part may be left in situ and the sintering temperature/atmosphere schedule may proceed as one continuous process. The sintering operation is standard and in accordance with prior art sintering techniques. In the case of oxide ceramics, air firing is normally employed. In the case of metallic materials, neutral, reducing or vacuum atmospheres are commonly employed, Dew Point is a commonly measured and controlled parameter in sintering as well as other oxidation potential measurements.

If it is desirable to recover the removed binder, the permeable green part can be removed from the porous body and the binder recovered by washing, distillation, solvent extraction, etc. by processing the porous body containing the removed binder through an appropriate recovery process, which abound in the art. After proper sintering in a furnace or kiln in accordance with standard techniques, the final part is produced and removed from the kiln.

The articles manufactured in accordance with the above discussed steps have been found to undergo a substantially isotropic shrinkage that is repeatable and substantially predictable. Precision articles of metals and non-metal have been formed and have been found to be reproducible with high yields.

It has been found desirable to have a material as the binder that has a relatively well defined melting point and low liquid viscosity with excellent wetting properties.

EXAMPLE I

Three hundred fifteen grams of substantially spherical nickel particulate material having an average particle size of four to seven microns and a specific surface area of 0.34 square meters per gram (Inco type 123 nickel powder) was mixed with 35.2 grams of carnauba wax. The mixture was placed in a laboratory type sigma blade mixer of one guart capacity and mixed at a temperature of 100° C. for a period of one half hour. A homogeneous, uniform and modest viscosity plastisole was formed. It was removed from the mixer, allowed to cool for an hour until the carnauba wax had solified. The hardened material was broken up by a hammer and the pieces were placed into an injection molding machine of one-half ounce capacity. Several dozen rings were formed in the injection molding machine. Three at random were removed from this batch and placed in a Blue M laboratory oven on laboratory filter paper and the temperature was slowly raised from ambient temperature to the melting point of the binder of carnauba wax over a period of twenty minutes. The oven was permitted to sit at this temperature overnight for about 12 hours after which a ring of carnauba wax on the filter paper was noticed. The temperature over the next 8 hours was raised to 100° C. and the oven was maintained at this temperature overnight. The following day the molded wax ring on the filter paper had increased greatly. The temperature in the oven was then raised to 150° C. for 48 hours whereupon the temperature was again raised to 200° C. for 8 hours. The oven was then allowed to cool and, when the temperature was close to room temperature, the three rings were removed therefrom. The rings were then placed into a controlled atmosphere kiln, the atmosphere of which was maintained at 90% argon and 10% hydrogen at a dew point of less than minus 60° C. The temperature was raised in the course of the next 24 hours from ambient to 700° F. in a substantially linear manner. The temperature was then raised to 1300° F. and maintained and then raised to a temperature of 2150° F. over a course of 6 hours in a linear manner. This temperature was maintained for one hour and the kiln was shut off and allowed to cool to substantially room temperature. The three rings were removed from the kiln and weighed and placed in a pycnometer and the density of each of the rings was determined to be 8.54 grams/cc. A metallographic section of one specimen was then made, embedded in bakelite, polished and etched as to ASTM specification and then placed under a microscope. Spherical inclusions were noted substantially homogeneously distributed throughout the sample. The inclusions were much smaller than the crystal size and had a tendency to be located along crystal boundaries. The general appearance was that of forged material with spherical inclusions. The second ring that was removed from the kiln was measured and found to have an outside diameter of 0.890 to 0.886 inches since a perfect circle was not obtained. The second ring was then placed in a circular die of diameter 0.885 inches and forced through the die by an arbor press. The ring was measured and found to have a substantially uniform diameter of 0.886 inches. That portion of the ring that was forced through the die was bright and shiney in appearance. As measured by a pycnometer, the density was found to be 8.65 after having made a weight check. The weight of the part was found to remain substantially constant. A metallographic section was made of the second ring in the manner described above. It was found that the uniform spherical inclusion structure had been altered by the compression of the outer circumference of the ring so that the outermost inclusions having compressed into an oblate shape with major axis about the same as the diameter of the sphere and the minor axis lying along the plane of the radius of the ring. The spherical inclusions along the inner diameter of the ring were found to be relatively unchanged.

EXAMPLE II

A run was made exactly the same as in Example I with exactly the same equipment with the particulate material being changed from nickel to substantially spherical iron of average particle diameter of 4 to 6 microns of substantially spherical shape. In this example 278.19 grams of iron were mixed with carnauba wax. The same testing procedure as set forth in Example I was utilized and the results were substantially identical to those listed in Example I that the density of the rings removed from the kiln was approximately 7.46. The same results as in Example I were obtained after compression of the rings in a die in an arbor press.

EXAMPLE III

A further run was made using exactly the same procedure as set forth in Example I except that a mixture of nickel and iron was substituted for the nickel alone. 50% of the weight of nickel as set forth in Example I and 50% of the weight of iron as set forth in Example II were utilized and mixed with the 35.2 grams of carnauba wax. The results were exactly as set forth above with reference to Example I. The density of the rings after removal from the kiln was not measured specifically but the volume was found to have decreased after removal from the die. The weight of the body after sintering and after removal from the die was substantially the same. The article was observed during the metallographic observation under the microscope was noted to be a true alloy rather than isolated regions of nickel and iron.

EXAMPLE IV 185.3 grams of $Fe_2O_3$ of particle size less than 1 micron (of the type used for making magnetic tape as is well known) was mixed with 35.2 grams of carnauba wax and then operated on as set forth in Example I. The ring was molded as in Example I and binder finally removed in the manner as set forth in Example I, except that the firing schedule in the atmospheric kiln was not the same and hydrogen was continually flowed through the sintering region of the kiln to maintain a reducing atmosphere therein. The temperature was immediately raised to 700° F. and thereafter there was no difference in the firing schedule as set forth in Example I. The iron oxide is found to be reduced to metallic iron by the hydrogen component of the sintering atmosphere. There was also found to be a substantial decrease in volume of the ring during sintering. When the sintered pieces that were left were measured with a pycnometer, before and after hitting with a hammer, it was determined qualitatively that crushing took place. It was also found quantitatively in the pycnometer that density increased. The important feature in this example is that $Fe_2O_3$ is a brittle material and so the starting material is brittle and does not have ductility at any time whereas the sintered material evolved did have ductility.

EXAMPLE V

A green body is formed by injection molding a mixture of 278.19 grams of iron powder having a particle size of 3 to 5 microns diameter and substantially spherical in shape in 35.2 grams of a paraffin binder having a melting point of 56° C.–0.5° C. This mixture was formed by prior art techniques as set forth in British Patent No. 1,516.079. The shape of the injection molded green body was a plate approximately ¾ inch by ¾ inch by 0.2 inch thick. The green plate was placed on a 2 inch by 2 inch square piece low ash filter paper which was in turn placed upon a porous ceramic (cordierite-magnesium silicon aluminate) plate.

The assembly was placed in an oven at a temperature of 80° C. In one hour the filter paper was saturated by melted paraffin as was the ceramic region directly under the green plate. The oven temperature was then increased to 125° C. for one hour, at which time the green plate was removed and placed in a controlled atmospheric sintering oven and sintered according to a linear increase in temperature over a 24 hour period from room temperature to a sintering temperature of 2100° F. and held there for one hour. The sintered part was approximately 95% of theoretical maximum density and free from cracks and bubbles.

EXAMPLE VI

Example V was repeated except that the binder was a 50%–50% mixture of the paraffin and carnauba wax. The same schedule was followed with the same results.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. A method for producing an article from a fired particulate configuration comprising the steps of:
   (a) forming an admixture by mixing together predetermined amounts of sinterable particulate material wherein each particle has a surface and a sufficient amount of a binder so that the binder covers substantially all of the surface of the particles of the particulate material;
   (b) forming said admixture from (a) into a desired green body configuration with an exterior surface and an intersticial volume formed between the sinterable particles;
   (c) causing a portion of said binder in said green body configuration at the surface region thereof to travel in a direction away from all but a small selected portion of said surface of said green body and to said small selected portion of said surface of said green body and causing the remaining binder in said green body to travel in a direction to said small selected portion of said surface of said green body by applying to said selected portion of said surface of said green body an absorbing body capable of absorbing said binder which is wetted by said binder to remove binder from said green body; and
   (d) sintering said binder-removed and formed configuration from (c).

2. A method as set forth in claim 1 wherein said sinterable particulate material is taken from the class consisting of metals, ceramics and cermets.

3. A method as set forth in claim 1 wherein the amount of binder utilized is substantially equal to the volume of the interstices between the sinterable particles plus a minute volume.

4. A method as set forth in claim 2 wherein the amount of binder utilized is equal to the volume of the interstices between the sinterable particles plus a minute volume.

5. A method as set forth in claim 1 wherein said configuration is substantially non-deformed at sintering temperatures for said sinterable particulate material during said step of sintering and wherein said temperature is elevated continuously after binder removal to sintering temperature for said sinterable particulate material.

6. A method as set forth in claim 2 wherein said porous body is substantially non-deformed at sintering temperatures for said particulate material during said step of sintering and wherein said temperature is elevated continuously after binder removal to sintering temperature for said particulate material.

7. A method as set forth in claim 3 wherein said porous body is substantially non-deformed at sintering temperatures for said particulate material during said step of sintering and wherein said temperature is elevated continuously after binder removal to sintering temperature for said particulate material.

8. A method as set forth in claim 4 wherein said porous body is substantially non-deformed at sintering temperatures for said particulate material during said step of sintering and wherein said temperature is elevated continuously after binder removal to sintering temperature for said particulate material.

9. A method of manufacturing sintered parts of particulate material comprising of the steps of:
   (a) mixing together predetermined amounts of powdered particulate material and a binder to produce a liquid slurry mixture, said binder being comprised of at least two components having differing melting points, at least a lower melting point binder component and a higher melting point binder component;
   (b) molding the mixture of particulate material and binder into a part of desired shape by injecting said mixture under heat and pressure into a mold, and allowing said mixture to solidify;
   (c) removing the lower melting point component of the binder;
   (d) then removing the higher melting point component of the binder; and
   (e) subjecting the debinderized part to a final sintering temperature to complete sintering.

10. A method as set forth in claim 9 wherein said sinterable particulate material is taken from the class consisting of metals, ceramics and cermets.

11. A method as set forth in claim 9 wherein the volume of binder utilized is substantially equal to the volume of the interstices between the sinterable particles plus a minute volume.

12. A method as set forth in claim 10 wherein the volume of binder utilized is equal to the volume of the interstices between the sinterable particles plus a minute volume.

13. A method for producing an article from a fired particulate configuration comprising the steps of:
   (a) forming an admixture by mixing together predetermined amounts of particles of a sinterable particulate material wherein each particle has a surface and a sufficient amount of a binder so that the binder covers substantially all of the surface of the particles of the particulate material;

(b) forming said admixture from (a) into a desired green body configuration with an exterior surface;

(c) removing at least a substantial portion of said binder from said configuration by capillary action by applying an absorbing body to a selected small portion of the surface of said green body configuration to cause said binder in said green body configuration to travel onto said absorbing body; and (d) sintering said binder-removed and formed configuration from (c).

14. The method of claim 13, further including the step of exposing the surface of said configuration other than said selected small portion to an ambient atmosphere during step (c).

15. The method of claim 13, further including the step of applying only force of the ambient atmosphere to the surface of said configuration other than said selected small portion during step (c).

16. The method of claim 13 wherein step (c) includes providing a pressure gradient between said configuration and said absorbing body.

17. The method of claim 13 further including placing said configuration in a state of compression during step (c).

18. The method of claim 13 wherein said absorbing body has an absorbing surface shape which is different from the shape of the adjacent configuration.

19. A method as set forth in claim 13 wherein said sinterable particulate material is taken from the class consisting of metals, ceramics and cermets.

20. The method of claim 13 wherein step (d) is carried out in a reducing atmosphere.

* * * * *